United States Patent
Ender et al.

(10) Patent No.: US 7,530,223 B2
(45) Date of Patent: May 12, 2009

(54) TORSIONAL VIBRATION DAMPER FOR A HYDRODYNAMIC CLUTCH ARRANGEMENT

(75) Inventors: Georg Ender, Obereisenheim (DE); Herbert Johann, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 236 days.

(21) Appl. No.: 11/595,226

(22) Filed: Nov. 10, 2006

(65) Prior Publication Data

US 2007/0149294 A1    Jun. 28, 2007

(30) Foreign Application Priority Data

Nov. 11, 2005    (DE) ........................ 10 2005 053 804

(51) Int. Cl.
*F16F 15/12* (2006.01)
*F16H 45/00* (2006.01)

(52) U.S. Cl. ........................ 60/338; 464/68.5
(58) Field of Classification Search .................. 60/338; 464/68.5

See application file for complete search history.

(56) References Cited

U.S. PATENT DOCUMENTS

| | | | | |
|---|---|---|---|---|
| 4,727,970 A | * | 3/1988 | Reik et al. | 464/68.5 |
| 4,739,866 A | * | 4/1988 | Reik et al. | 464/68.2 |
| 4,783,895 A | * | 11/1988 | Reik | 464/68.3 |
| 4,928,486 A | * | 5/1990 | Despres | 60/338 |
| 5,245,889 A | | 9/1993 | Kohno et al. | |
| 5,761,970 A | | 6/1998 | Bonfilio | |
| 6,129,192 A | * | 10/2000 | Jackel et al. | 464/68.5 |
| 6,478,127 B2 | | 11/2002 | Fukushima | |

FOREIGN PATENT DOCUMENTS

| | | |
|---|---|---|
| DE | 42 11 840 | 10/1992 |
| DE | 196 24 726 | 1/1997 |
| DE | 695 08 224 | 6/1999 |
| DE | 198 51 819 | 11/2000 |
| DE | 101 10 693 | 8/2003 |

OTHER PUBLICATIONS

German Office Action dated Nov. 14, 2007 issued in corresponding German application No. 10 2005 053 804.5-27.

* cited by examiner

*Primary Examiner*—Thomas E Lazo
(74) *Attorney, Agent, or Firm*—Cohen Pontani Lieberman & Pavane LLP

(57) ABSTRACT

The torsional vibration damper includes a drive-side damping element arranged nonrotatably with respect to a flywheel mass element fastened to the drive, and a takeoff-side damping element, which is centered and axially positioned by the flywheel mass element and which is in functional connection with a takeoff. The drive-side damping element is connected to the takeoff-side damping element via elastic elements.

14 Claims, 4 Drawing Sheets

TORSIONAL VIBRATION DAMPER FOR A HYDRODYNAMIC CLUTCH ARRANGEMENT

BACKGROUND OF THE INVENTION

Field of the Invention

The invention pertains to a torsional vibration damper for a hydrodynamic clutch arrangement.

U.S. Pat. No. 6,478,127 shows a torsional vibration damper installed axially between a flywheel mass element, which is attached to a drive such as the crankshaft of an internal combustion engine, and a housing of the hydrodynamic clutch arrangement, which is realized as a torque converter. The torsional vibration damper is provided with a drive-side damping element, which is connected nonrotatably on one side to the flywheel mass element and connected for rotation in common on the other side by means of elastic elements to the takeoff-side damping element of the torsional vibration damper, the takeoff-side damping element being in functional connection by way of the hydrodynamic clutch arrangement with a takeoff, formed by a gearbox input shaft.

In the known torsional vibration damper, the drive-side damping element is both centered and positioned axially by virtue of its attachment, jointly with the flywheel mass element, to the crankshaft. Although the takeoff-side damping element, which is formed as an integral part of the housing of the hydrodynamic clutch device, is centered by a bearing journal of the housing in a recess in the crankshaft, it is not axially positioned by this journal, which means that relative movement in the axial direction between the housing and the crankshaft can lead to constraining forces and stresses on the components of the torsional vibration damper. The result is at least an impairment to the proper functioning of the torsional vibration damper.

SUMMARY OF THE INVENTION

It is an object of the present invention to connect a torsional vibration damper both to a drive and to a housing of a hydrodynamic clutch arrangement in such a way that relative movement between the housing and the drive in the radial or axial direction cannot lead to constraining forces or stresses on the components of the torsional vibration damper.

According to a preferred embodiment of the invention, the torsional vibration damper acting between a drive and a housing of a hydrodynamic clutch arrangement comprises a drive-side damping element arranged for rotation in common with a flywheel mass element fastened to the drive, and a takeoff-side damping element, which is centered and axially positioned by the flywheel mass element and which is in functional connection with a takeoff, the drive-side damping element being connected to the takeoff-side damping element via elastic elements.

Because the takeoff-side damping element of the torsional vibration damper is positioned both radially and axially on a flywheel mass element permanently attached to a drive such as the crankshaft of an internal combustion engine, both the takeoff-side damping element and the drive-side damping element are centered and axially positioned with respect to the same component, namely, the flywheel mass element. Thus the only remaining degree of freedom which the two damping elements have is that which is necessary for them to function, namely, the freedom of relative rotational deflection around an axis of rotation of the drive and of the housing. Because the two damping elements are both positioned with respect to the flywheel mass element, furthermore, it is ensured that the damping elements are relieved of both radial and axial forces and are thus unable to generate any constraining forces or stresses on each other. This also obviously applies when the takeoff-side damping element is connected to the housing of the clutch device, designed as a hydrodynamic torque converter or hydraulic clutch, by way of an axially flexible drive plate and the housing is therefore unable to rotate relative to the flywheel mass element but does have a certain freedom of movement in the axial direction. As a result, without any interference with the transmission of torque between the drive and the housing of the hydrodynamic clutch device and without any impairment to the function of the torsional vibration damper, the wobbling movements of the drive, which always have at least one axial component, are not transmitted to the housing at all or only at a reduced level.

The takeoff-side damping element is preferably supported on the flywheel mass element, serving as a component permanently connected to the drive, by way of a bearing arrangement. This bearing arrangement minimizes the wear between the flywheel mass element, which defines the movements of the drive-side damping element of the torsional vibration damper, and the takeoff-side damping element of the torsional vibration damper. In an especially simple embodiment, the bearing arrangement can have at least one radial bearing and at least one axial bearing, each in the form of a journal bearing element. In an especially low-friction embodiment, however, it can have roller bearing elements, at least one of which acts as a radial bearing and at least one of which acts as an axial bearing. Of course, combinations of journal bearing elements and roller bearing elements with each other are also possible. Additional design variants of the bearings are described in the detailed description of preferred embodiments.

The bearing arrangement can be located directly between the flywheel mass element and the takeoff-side damping element, but it can also be provided between the flywheel element and a support ring, which separates the bearing arrangement from the takeoff-side damping element. In addition to at least one cover plate, which serves to actuate the elastic elements of the torsional vibration damper, the takeoff-side damping element preferably also has a takeoff hub, nonrotatably connected to this cover plate. This hub can be supported axially on one side via the support ring and the bearing arrangement against the flywheel mass element, whereas, on the other side, it preferably holds the previously mentioned axially elastic drive plate, which connects the flywheel mass element to the housing of the clutch device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below on the basis of exemplary embodiments.

DETAILED DESCRIPTION OF THE PRESENTLY PREFERRED EMBODIMENTS

Figure 1:
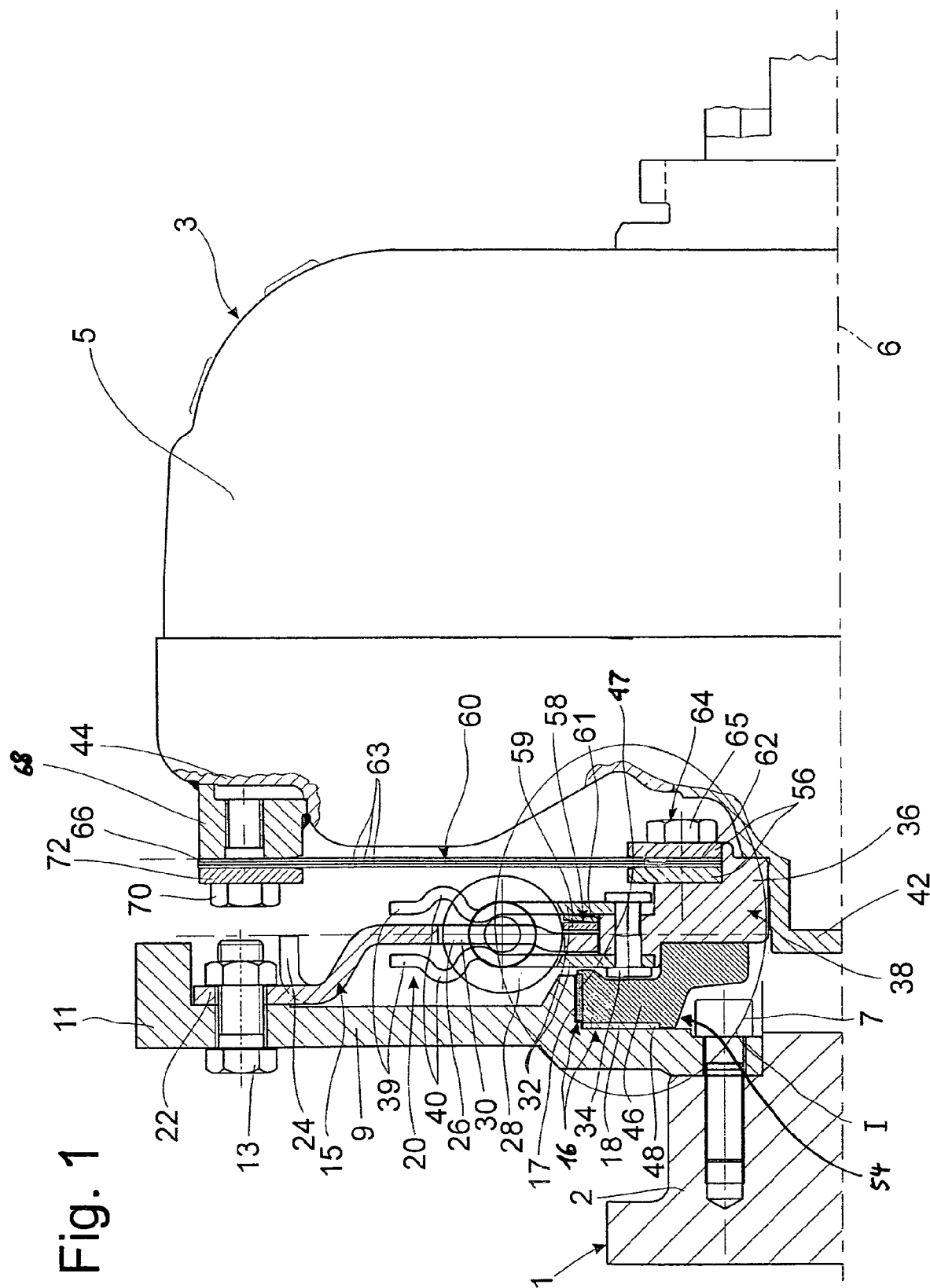
FIG. 1 is a cross-sectional view of a torsional vibration damper for a hydrodynamic clutch device, where a drive-side damping element is permanently attached to a flywheel mass element, and a takeoff-side damping element rests against the flywheel mass element by way of a bearing arrangement consisting of a radial bearing and an axial bearing in the form of journal bearing elements.

FIG. 1 shows a drive 1 in the form of a crankshaft 2 of an internal combustion engine (not shown) for a hydrodynamic clutch arrangement 3, realized as a torque converter or hydraulic clutch, for example, where the clutch arrangement 3 has a housing 5. The clutch arrangement 3 has essentially the same axis of rotation 6 as the drive 1.

A flywheel mass element 9 is attached to the crankshaft 2 by means of fastening elements 7. The flywheel mass element 9 extends outward essentially in the radial direction until its outer circumference merges with an axial extension 11 pointing toward the hydrodynamic clutch arrangement 3. Directly inside the axial extension 11 in the radial direction, a hub flange-shaped, drive-side damping element 15 of a torsional vibration damper 20 is attached to the flywheel mass element 9 by fastening elements 13. The fastening elements 13 are held in the holding sections 22 of the damping element 15. These holding sections are provided at predetermined circumferential distances from each other and extend outward in the radial direction beyond the sections 24, which are located circumferentially between the holding sections and which are bent in the axial direction to provide a stiffening function.

The drive-side damping element 15 has windows 26 to hold elastic elements 28, where these windows 26 are provided at their circumferential ends with drive elements 30 for actuating the elastic elements 28. The elastic elements 28 are supported at their other end against drive elements 39 of the cover plates 32. These drive elements 39 form the circumferential boundaries of openings 40. The cover plates 32 are fastened to a takeoff-side hub 36 by rivets 34 so that, together with it, they form the takeoff-side damping element 38 of the torsional vibration damper 20. One of the cover plates 32 holds a friction device 58 axially between itself and the drive-side damping element 15, the friction device 58 being provided with an axial spring 61 braced against the cover plate 32 and a friction disk 59, which is in working contact with the axial spring 61 and rests against the drive-side damping element 15.

The takeoff-side hub 36 of the torsional vibration damper 20 centers a bearing journal 42 of a housing cover 44 of the housing 5 but allows the housing 5 a certain freedom of movement in the axial direction. On the drive side, the takeoff-side hub 36 is supported against the flywheel mass element 9 by a support ring 46 and a bearing arrangement 16, formed by a radial bearing 17 with a radial journal bearing element 47 and by an axial bearing 18 with an axial journal bearing element 48. The flywheel mass element 9 is provided with a recess 54 to accommodate the bearing arrangement 16 and the support ring 46. The torsional vibration damper 20 and especially its takeoff-side damping element 38 are thus positioned by the bearing arrangement 16 and the support ring 46 both axially and radially with respect to the flywheel mass element 9 and with respect to the drive 1.

On the takeoff-side, the takeoff-side hub 36 of the torsional vibration damper 20 holds the radially inner end, serving as the drive side 62, of an axially flexible drive plate 60, referred to in brief in the following as the flexplate 60, between two radially inner stiffening rings 56. The flexplate 60 can be formed by a stack of spring rings 63. The drive side 62 of the flexplate 60 and the radially inner stiffening rings 56 are attached jointly to the takeoff-side hub 36 by fastening elements 65, which act as a detachable connection 64. In addition, the radially outer end of the flexplate 60, which acts as the takeoff-side 66, is fastened to receptacles 68 in the housing 5 by fastening elements 70, which grip the flexplate 60 by way of radially outer stiffening rings 72.

Figure 2:
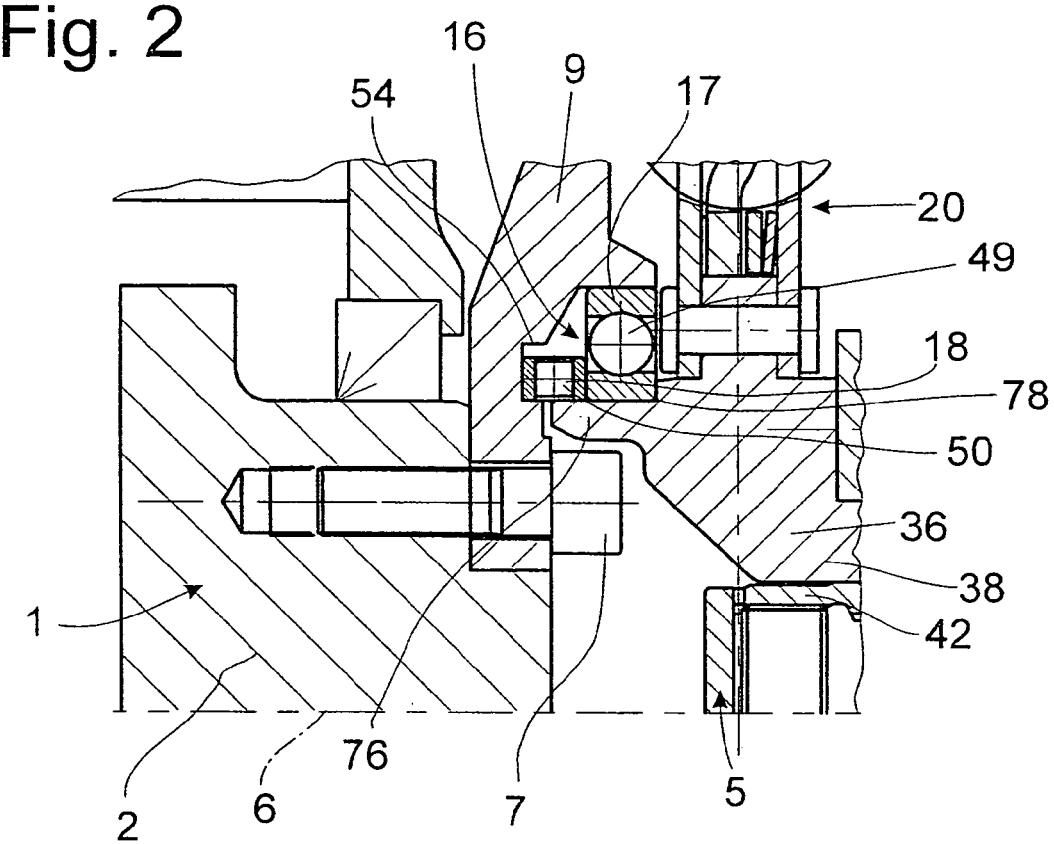
FIG. 2 is an isolated view of the area I inside the circle in FIG. 1, the difference being that the bearing arrangement consists here of a radial bearing and an axial bearing in the form of roller bearing elements.

FIG. 2 shows in a separate drawing the same area I as that enclosed by the circle in FIG. 1, except that the bearing arrangement 16 here is different than that of FIG. 1. The radial bearing 17 is realized here by a radial roller bearing element 49, and the axial bearing 18 is realized by an axial roller bearing element 50, where the two roller bearing elements 49, 50 are essentially perpendicular to each other and thus enter into contact with each other in such a way that a bearing ring of one of the roller bearing elements 49, 50 enters into functional connection with a bearing ring of the other roller bearing element 49, 50. In the concrete case shown in FIG. 2, these are the takeoff-side bearing ring of the axial roller bearing element 50 and the radially inner bearing ring of the radial roller bearing element 49. The two bearing rings just mentioned are both accommodated in a recess 78 in one of the bearing holders 76, provided for the purpose of centering, on the takeoff-side hub 36 of the takeoff-side damping element 38. The other bearing ring of each of the roller bearing elements 49, 50 engages instead in the recess 54 in the flywheel mass element 9. In this design of the bearing arrangement 16, the support ring 46 shown in FIG. 1 can therefore be omitted.

Figure 3:
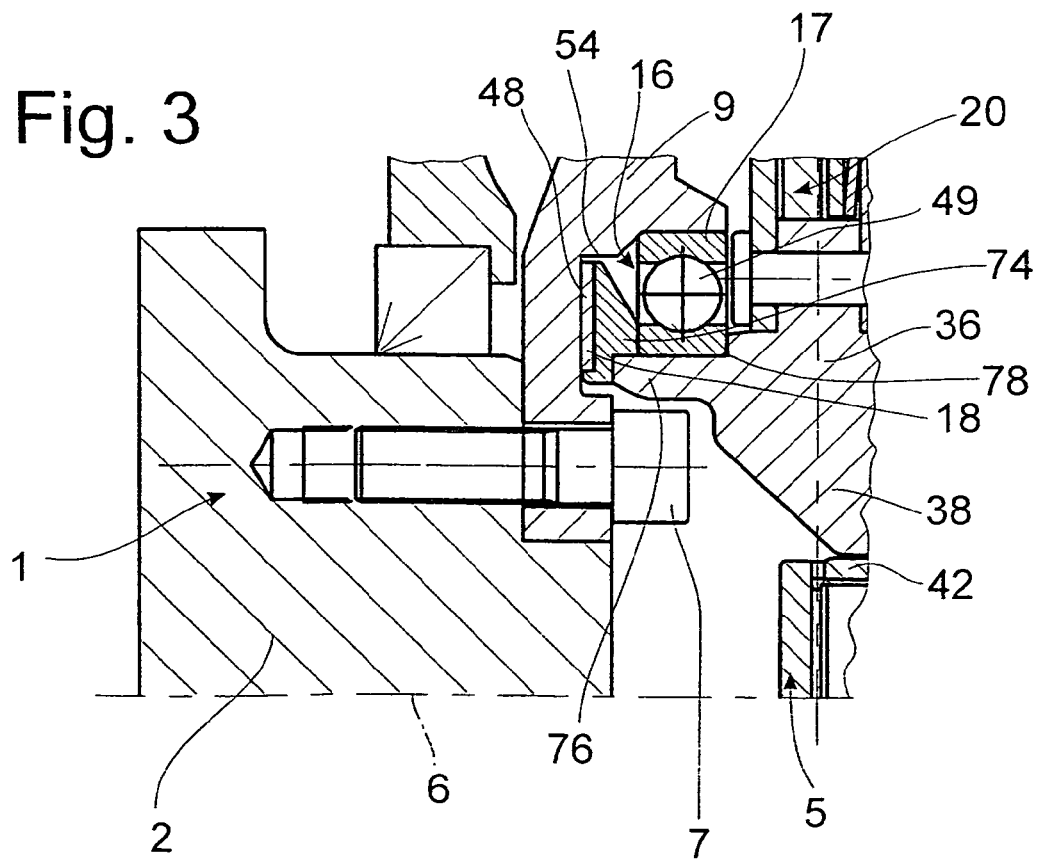
FIG. 3 is similar to FIG. 2 but shows a bearing arrangement consisting of a radial bearing in the form of a roller bearing element and an axial bearing consisting of a journal bearing element.

This is also true for the design of the bearing arrangement 16 according to FIG. 3. The radial bearing 17 is identical here to that of FIG. 2, but its radially inner bearing ring is in functional connection with an axial journal bearing element 48, serving as the axial bearing 18, by way of a spacer 74. The journal bearing element for its own part, like the radially outer bearing ring of the radial roller bearing element 49, is supported in the recess 54 in the flywheel mass element 9.

Figure 4:
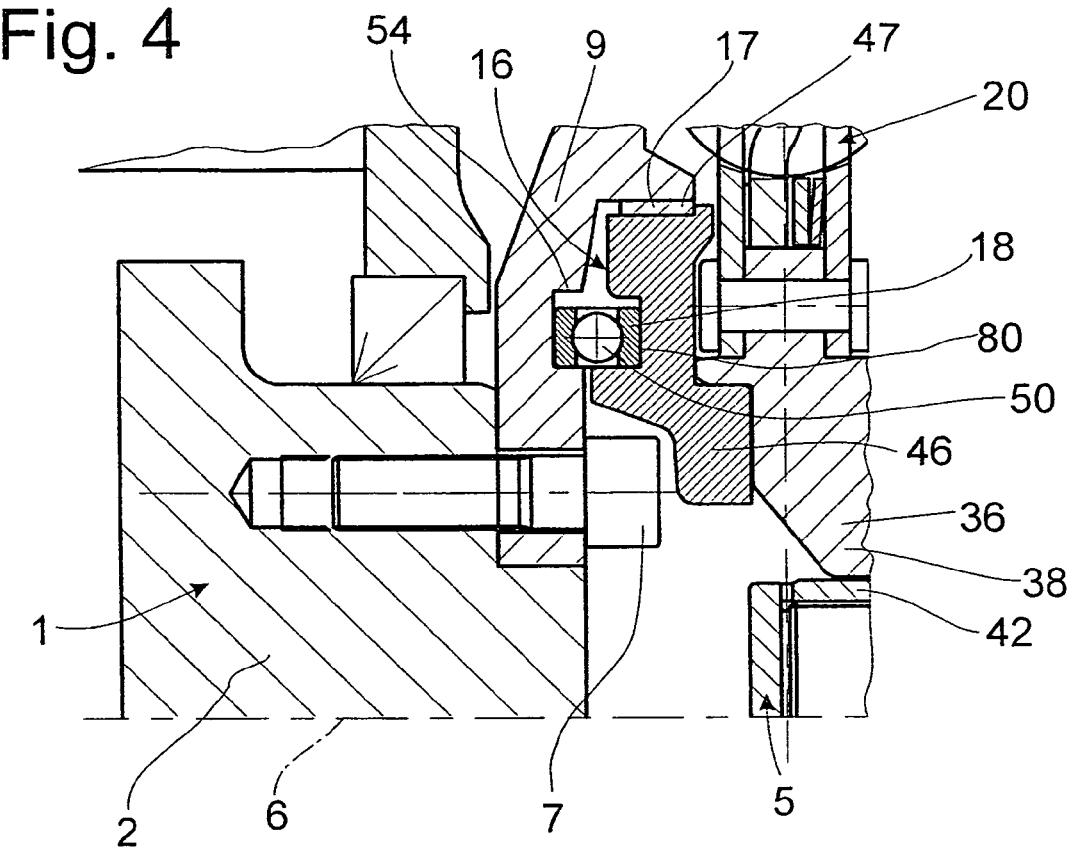
FIG. 4 is similar to FIG. 2, except that the bearing arrangement consists of a radial bearing in the form of a journal bearing element and an axial bearing consisting of a roller bearing element.

In FIG. 4, the journal bearing elements and roller bearing elements of FIG. 3 have changed places with each other. Now the radial bearing 17 is formed by a radial journal bearing element 47, and the axial bearing 18 is formed by an axial roller bearing element 50, the drive-side bearing ring of which, along with the radial journal bearing element 47, is supported in the recess 54 in the flywheel mass element 9. The other bearing ring of the axial roller bearing element 18, meanwhile, engages in a recess 80 in the support ring 46.

Figure 5:
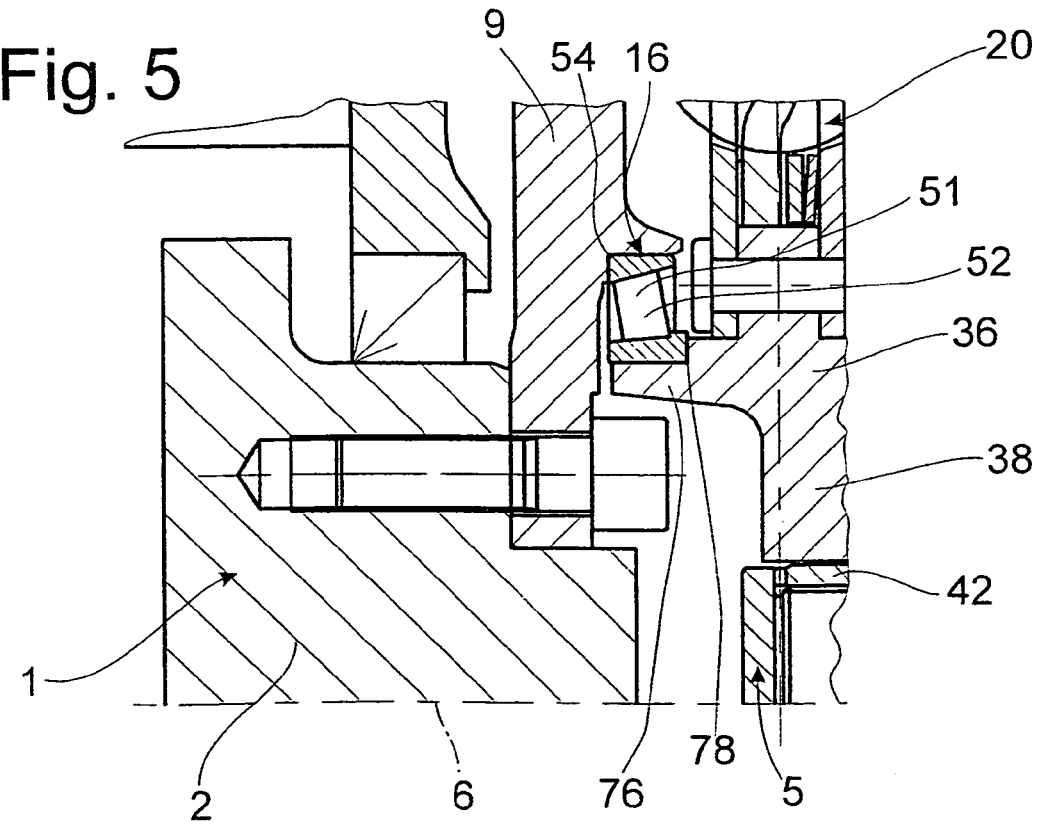
FIG. 5 is similar to FIG. 2 except that the bearing consists of a single tapered roller bearing, which provides both radial support and axial support.
Figure 6:
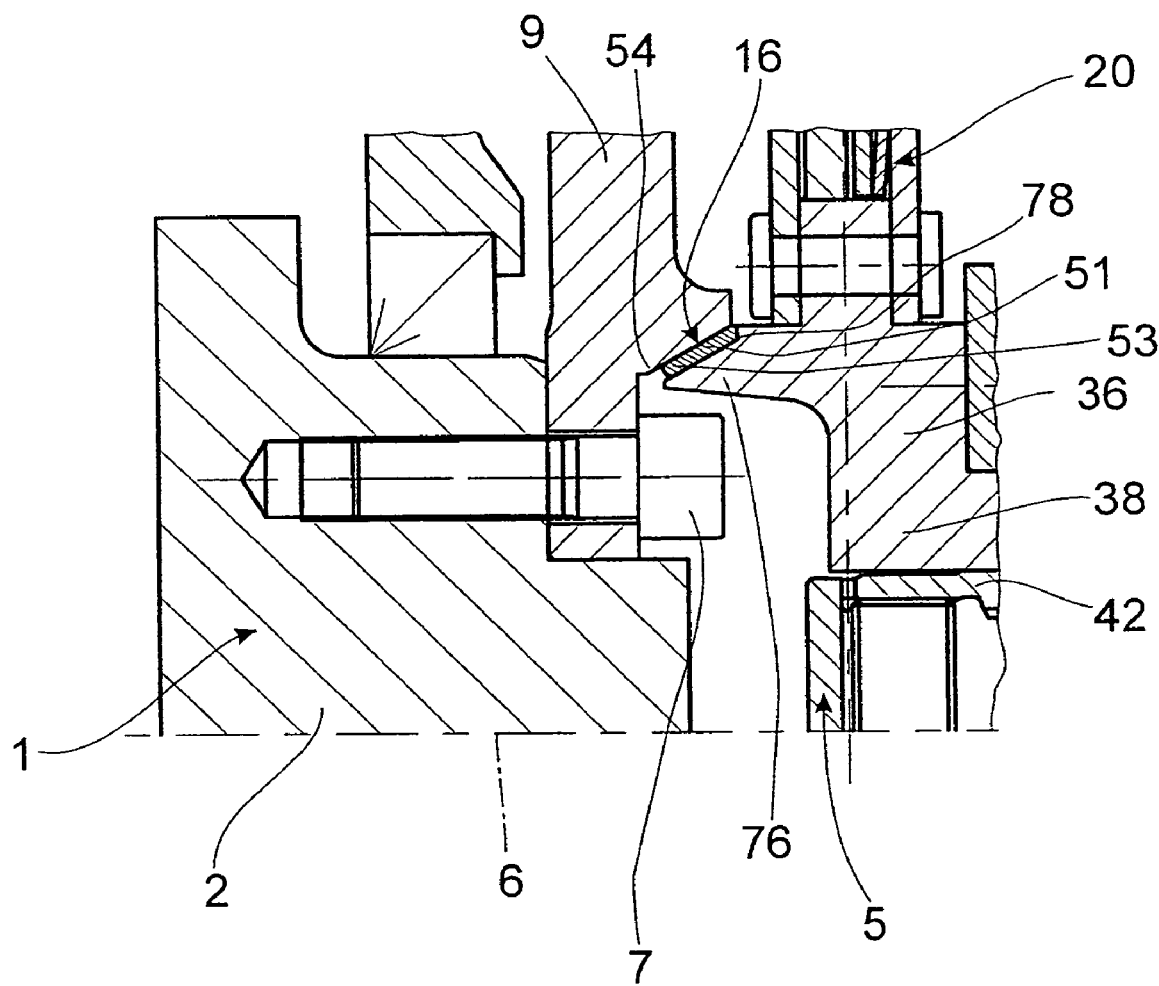
FIG. 6 is similar to FIG. 5, except that the bearing arrangement consists of a single journal bearing element positioned at an angle.

In contrast to the previously shown embodiments of the bearing arrangement 16, FIGS. 5 and 6 show a single angular-contact bearing 51 as the bearing arrangement 16.

According to FIG. 5, this angular-contact bearing 51 is designed as a tapered roller bearing 52, in which the radially outer bearing ring is supported in the recess 54 in the flywheel mass element 9, whereas the radially inner bearing ring is supported in the recess 78 in the bearing holder 76. The tapered roller bearing 52 provides both radial and axial support for the takeoff-side hub 36 of the takeoff-side damping element 38 against the flywheel mass element 9.

FIG. 6 shows the angular-contact bearing 51 as a journal bearing element 53, installed at a certain angle. One side of the element is held in the recess 54 in the flywheel mass element 9, and the other side is held in the recess 78 in the bearing holder 76. The angled journal bearing element 53 thus also provides both radial and axial support of the takeoff-side hub 36 of the takeoff-side damping element 38 against the flywheel mass element 9.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper acting between a drive and a housing of a hydrodynamic clutch arrangement and comprising:
    a drive-side damping element arranged nonrotatably with respect to a flywheel mass element fastened to the drive;
    a takeoff-side damping element, which is centered and axially positioned by the flywheel mass element and which is in functional connection with a takeoff; and
    elastic elements arranged circumferentially between the drive-side damping element and the takeoff-side damping element, such that the drive-side damping element is rotatable relative to the takeoff-side damping elements against the urgency of the elastic elements
    wherein the takeoff-side damping element is in functional connection with the flywheel mass element through a bearing arrangement and the bearing arrangement comprises a radial bearing and an axial bearing.

2. The torsional vibration damper of claim 1, wherein the bearing arrangement is centered and axially positioned in a recess in the flywheel mass element.

3. The torsional vibration damper of claim 1, wherein at least one of the radial bearing and the axial bearing is a journal bearing element.

4. The torsional vibration damper of claim 1, wherein at least one of the radial bearing and the axial bearing is a roller bearing element.

5. The torsional vibration damper of claim 4, wherein the radial bearing or the axial bearing is supported on a bearing ring of the roller bearing element.

6. The torsional vibration damper of claim 1, wherein the takeoff-side damping element has a takeoff hub centering the housing of the clutch arrangement with respect to the flywheel mass element and thus with respect to the drive relative to an essentially common axis of rotation.

7. The torsional vibration damper of claim 6, wherein the takeoff hub of the takeoff-side damping element is designed to surround and center a bearing journal provided in a radially central area of the housing of the clutch arrangement.

8. The torsional vibration damper of claim 1, wherein the drive-side damping element is connected to the flywheel mass element.

9. A torsional vibration damper acting between a drive and a housing of a hydrodynamic clutch arrangement and comprising:
    a drive-side damping element arranged nonrotatably with respect to a flywheel mass element fastened to the drive;
    a takeoff-side damping element, which is centered and axially positioned by the flywheel mass element and which is in functional connection with a takeoff; and
    elastic elements arranged circumferentially between the drive-side damping element and the takeoff-side damping element, such that the drive-side damping element is rotatable relative to the takeoff-side damping elements against the urgency of the elastic elements
    wherein the takeoff-side damping element is in functional connection with the flywheel mass element through a bearing arrangement and wherein the bearing arrangement centers and axially positions the takeoff-side damping element by way of a support ring.

10. The torsional vibration damper of claim 9, wherein the support ring has a takeoff-side projection, by means of which it engages, for centering and for axial positioning, in a recess provided in the takeoff-side damping element.

11. A torsional vibration damper acting between a drive and a housing of a hydrodynamic clutch arrangement and comprising:
    a drive-side damping element arranged nonrotatably with respect to a flywheel mass element fastened to the drive;
    a takeoff-side damping element, which is centered and axially positioned by the flywheel mass element and which is in functional connection with a takeoff; and
    elastic elements arranged circumferentially between the drive-side damping element and the takeoff-side damping element, such that the drive-side damping element is rotatable relative to the takeoff-side damping elements against the urgency of the elastic elements
    wherein the takeoff-side damping element is in functional connection with the flywheel mass element through a bearing arrangement and wherein the bearing arrangement comprises an angular-contact bearing.

12. The torsional vibration damper of claim 11, wherein the angular-contact bearing is a tapered roller bearing.

13. The torsional vibration damper of claim 11, wherein the angular-contact bearing is a journal bearing element positioned at an angle.

14. A torsional vibration damper acting between a drive and a housing of a hydrodynamic clutch arrangement and comprising:
    a drive-side damping element arranged nonrotatably with respect to a flywheel mass element fastened to the drive;
    a takeoff-side damping element, which is centered and axially positioned by the flywheel mass element and which is in functional connection with a takeoff; and
    elastic elements arranged circumferentially between the drive-side damping element and the takeoff-side damping element, such that the drive-side damping element is rotatable relative to the takeoff-side damping elements against the urgency of the elastic elements
    wherein the takeoff-side damping element has a takeoff hub centering the housing of the clutch arrangement with respect to the flywheel mass element and with respect to the drive relative to an essentially common axis of rotation, and
    wherein the takeoff hub of the takeoff-side damping element is designed to hold the housing of the clutch arrangement by way of an axially flexible drive plate in such a way that the housing cannot rotate with respect to the takeoff hub but does have a certain freedom of movement in the direction parallel to the axis of rotation.

* * * * *